(12) United States Patent
Wagemans et al.

(10) Patent No.: US 6,697,606 B1
(45) Date of Patent: Feb. 24, 2004

(54) TRANSCEIVER AND A TELECOMMUNICATION SYSTEM HAVING A TRANSCEIVER

(75) Inventors: Antonius G. Wagemans, Eindhoven (NL); Petrus G. M. Baltus, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/185,759

(22) Filed: Nov. 4, 1998

(30) Foreign Application Priority Data

Nov. 6, 1997 (EP) ............................................. 97203448

(51) Int. Cl.[7] ................................................. H04B 1/40
(52) U.S. Cl. ............................ 455/86; 455/575; 455/550
(58) Field of Search ................................. 455/86, 76, 78, 455/75, 83, 550, 552, 553, 575, 112, 208, 87, 313, 318, 319, 323, 324; 331/1 R; 375/219

(56) References Cited

U.S. PATENT DOCUMENTS

| 5,311,149 A | * | 5/1994 | Wagner et al. ............... 331/1 A |
| 5,319,799 A | * | 6/1994 | Morita ......................... 455/78 |
| 5,355,517 A | * | 10/1994 | Olson ......................... 455/34.1 |
| 5,548,839 A | * | 8/1996 | Caldwell et al. ............. 455/313 |
| 5,574,985 A | * | 11/1996 | Ylikotila ...................... 455/76 |
| 5,621,755 A | * | 4/1997 | Bella et al. .................. 375/219 |
| 5,710,998 A | * | 1/1998 | Opas ........................... 455/324 |
| 5,802,463 A | * | 9/1998 | Zuckerman ................. 455/208 |
| 5,852,603 A | * | 12/1998 | Lehtinen et al. ............. 370/280 |
| 5,896,562 A | * | 4/1999 | Heinonen ...................... 455/76 |
| 5,898,907 A | * | 4/1999 | Maruyama .................... 455/76 |
| 5,937,335 A | * | 8/1999 | Park et al. ..................... 455/86 |
| 5,966,666 A | * | 10/1999 | Yamaguchi et al. ......... 455/552 |
| 5,983,081 A | * | 11/1999 | Lehtinen ...................... 455/76 |

FOREIGN PATENT DOCUMENTS

| EP | 0496498 A2 | 7/1992 | ............. H04L/5/14 |
| EP | 0752761 A2 | 1/1997 | ............. H04B/1/56 |
| NL | WO 99/25076 | * 5/1999 | ............. H04B/1/50 |

OTHER PUBLICATIONS

IEEE 93CH3316–7/93, Jul. 1997, Delvin et al., "A 2.4 GHz single chip transceiver".*

* cited by examiner

Primary Examiner—Edward F. Urban
Assistant Examiner—Charles Chow

(57) ABSTRACT

A transceiver comprises transmitter means and receiver means, mode means coupled to the transmitter means and the receiver means for simultaneously performing a receiving and transmitting of signals, oscillator means coupled to each of the transmitter means and the receiver means respectively, and frequency divider means coupled between the oscillator means on the one hand and the transmitter means, and receiver means respectively on the other hand. Such a transceiver is capable of operating in full duplex mode without the necessity to adding extra oscillator means to achieve such an operational mode, while in addition this saves components, costs, chip area, power dissipation and weight, which is important for in particular mobile communication applications.

9 Claims, 1 Drawing Sheet

TRANSCEIVER AND A TELECOMMUNICATION SYSTEM HAVING A TRANSCEIVER

Figure 1:
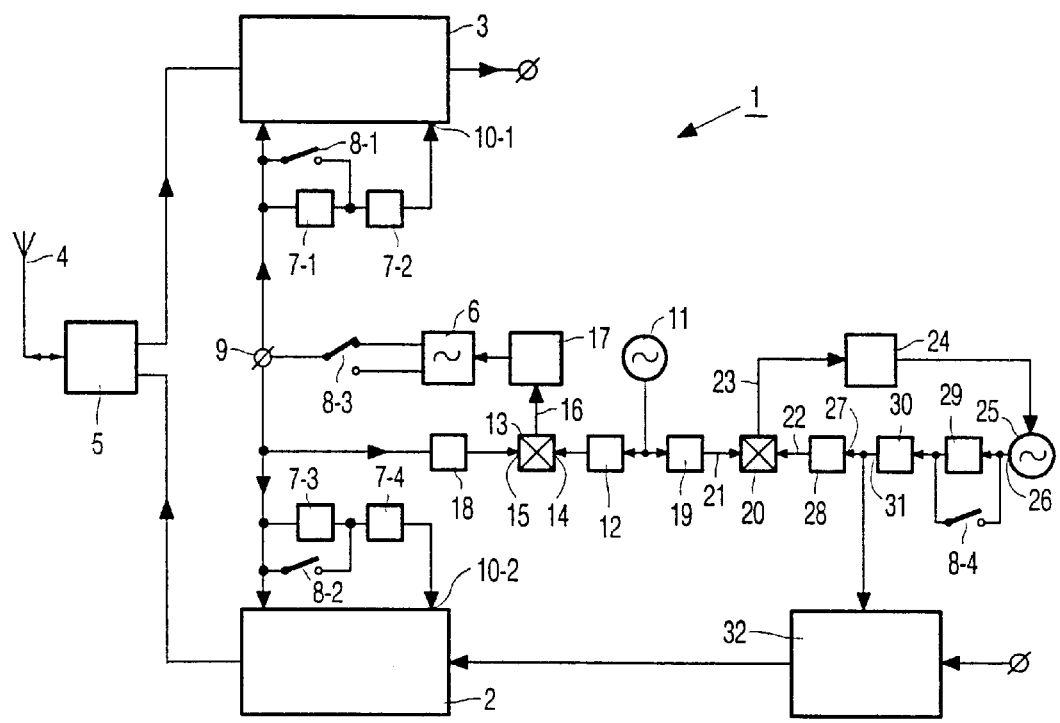

The present invention relates to a transceiver comprising transmitter means and receiver means, mode means coupled to the transmitter means and the receiver means for performing a signal transmission/receiving mode of the transceiver, an oscillator means coupled to each of the transmitter means and the receiver means respectively.

BACKGROUND OF THE INVENTION

Such a transceiver suitable for application in a communication system is known from EP-A-0 752 761. The known transceiver comprises an heterodyne receiver circuit having an antennae, diplex mode means, a transmitter circuit and a receiver circuit, and a local oscillator coupled to each of the transmitter and receiver circuits. The diplex mode means are embodied to allow either a signal transmission mode or a signal receiving mode, while use is being made of one local oscillator in both diplex modes. It is a disadvantage, that the known transceiver is not capable of allowing signals to be simultaneously received and sent.

SUMMARY OF THE INVENTION

It is an object of the present invention to provide a transceiver and telecommunication system having such a transceiver, which is capable of operating in full duplex mode without the necessity to adding extra oscillator means to achieve such an operational mode.

To this end in the transceiver according to the invention, the mode means are embodied to allow a simultaneous receiving and transmitting of signals, and the transceiver comprises frequency divider means coupled between the oscillator means on the one hand and the transmitter means, and receiver means respectively on the other hand. It is an advantage of the transceiver according to the invention despite its extended mode capabilities still only one local oscillator means is needed for operation in full duplex mode. This saves components, costs, chip area, power dissipation and weight otherwise spent on added circuitry. This makes the transceiver according to the invention well suitable for communication systems, such as radio transmission systems, audio- and/or video systems, control systems, telemetry systems, local area networks, wide area networks, and very well suitable for application in cordless or cellular telephone systems, as well as in handset, a car-transceiver for mobile communication, or a transceiver in a radio base station of a mobile network.

An embodiment of the transceiver according to the invention, which is very easy to integrate on only a limited chip area has the characterising features that the frequency divider means comprises at least one divider, preferably at least one 2-divider.

A further embodiment of the transceiver according to the invention is characterised in that the transceiver comprises short-circuiting means bypassing at least one of the dividers. The advantage thereof is that bypassing one or more of the dividers provides the possibility of frequency band switching, therewith switching from one working frequency used in the telecommunication system such as 900 MHz to another such as 1900 MHz.

Figure 2:
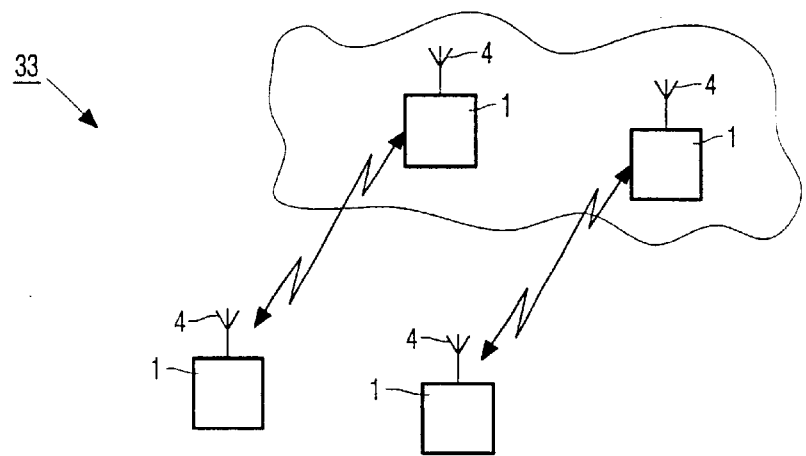

The present invention will now be described, by way of example, with reference to the accompanying drawings, wherein FIG. 1 shows a block diagram of a possible embodiment of a zero IF transceiver according to the invention, and FIG. 2 schematically shows a telecommunication system comprising mobile devices having a transceiver circuit according to the invention.

Throughout the figures the same reference numerals are used for the same features.

FIG. 1 shows a block diagram of a possible embodiment of a transceiver 1. The transceiver 1 comprises transmitter means 2 and receiver means 3, which are both coupled to an antennae 4 through mode means 5. The mode means 5 are capable of performing a full duplex communication with some other transceiver 1 or station, network or the like comprising such a transceiver 1. The transceiver 1 comprises oscillator means 6 coupled to each of the transmitter means 2 and the receiver means 3 respectively. The transceiver 1 comprises frequency divider means 7 coupled between the oscillator means 6 on the one hand and the transmitter means 2, and receiver means 3 respectively on the other hand. The frequency divider means 7, referred to as 7-1, 7-2, 7-3, and 7-4 comprises easy to integrate and implement frequency dividers, such as counters, flip-flops, 2-dividers, and/or if necessary 3-dividers or said dividers, counters and/or flip-flops connected in series, as shown in FIG. 1.

Reference is being made to European patent application 97.200739, filed Mar. 12, 1997, which is included herein by reference and which contains various examples of possible embodiments and arrangements of said dividers. The transceiver 1 can be embodied with a zero IF or a low IF receiver means 3 or transmitter means 2 respectively, for example of the dual conversion zero IF or low IF type. I and Q signals to be supplied to said means 2 and 3 are easily being outputted by the dividers 7-1, 7-2, 7-3, and 7-4. The transceiver 1 as shown comprises short-circuiting means 8 bypassing at least one of the dividers, such as 7-1, and 7-3. These externally provided short-circuiting means form one embodiment of switching means 8-1, 8-2, and 8-4 in particular semiconductor switching means for controlling the frequency division ratios of the frequency division means. In another possible embodiment (not shown) these switching means 8-1, 8-2, and 8-3 are known to be internally provided in the dividers themselves. The switching means 8-1 and 8-2, as well as 8-3, the latter being connected between the oscillator means 6 and a local oscillator terminal 9, and 8-4, are being used for switching from one receive/send frequency, such as approximately 800 MHz to another frequency such as approximately 1900 MHz. The oscillator means 6 as shown comprises two separate oscillators. Full duplex communication can take place at either of these frequencies.

If for example the dividers 7-1 to 7-4 are 2-dividers and switches 8-1 and 8-2 are closed then, if the oscillator means frequency on the local oscillator terminal 9 selected by switch 8-3 is 580 MHz (being ⅔ times $F_{RF}$) the receive/send frequency lies mainly around 870 MHz (being $F_{RF}$), whereas further local oscillator input terminals 10-1 and 10-2 on the receiver means 3 and the transmitter means 2 respectively receive 290 MHz (being ⅓ times $F_{RF}$) for dual conversion purposes. If switches 8-1 and 8-2 are open a local oscillator frequency on terminal 9 of 1544 MHz (then being ⅘ times $F_{RF}$) selected by switch 8-3 provides a receive/send frequency of 1930 MHz (then being $F_{RF}$) and a terminal 10-1/2 frequency of 386 MHz (then being ⅕ times $F_{RF}$).

So far FIG. 1 relates to dual conversion provided for in the transmitter means 2 and receiver means 3. As an alternative the frequency signals on terminals 10-1/10-2 and 9 can be used for single up or down conversion in these means 2, 3 if these signals are combined in for example a mixer. This ensures that correct frequency step sizes of 30 KHz and 50 KHz are generated in different operational modes, which will be elucidated in short later on. An alternative to said mixer mentioned above is the use of a multiplier, such as a frequency tripler if switch 8-2 is closed, and a 5× multiplier if 8-2 is open in order to generate $F_{RF}$.

Frequency stabilisation is being provided by a frequency stable oscillator 11 e.g. containing a crystal. The stable oscillator 11 is connected to a phase locked loop comprising a divider 12, a comparator 13 having one input 14 connected to the divider 12, a second input 15, and an output 16 for providing a frequency control signal through a loop filter 17 to the oscillator means 6. The local oscillator terminal 9 is connected to input 15 of comparator 13 through a divider 18. Of course the frequency division ratio of the dividers 12 and 18 of the phase locked loop as described are chosen such that a well known proper operation of the loop is achieved. The frequency stable oscillator 11 is also used for a stable frequency driving of a second phase locked loop comprising a divider 19, a comparator 20 having an input 21 connected to the divider 19, a second input 22, and an output 23 providing a frequency control signal through a loop filter 24 to a fixed frequency and thus fully integrated oscillator 25. The fixed frequency (offset) oscillator 25 has an oscillator output 26 coupled to input 27 of a divider 28 through dividers 29 and 30. Dividers' 28 output is input to second input 22 of comparator 20. Output 31 of divider 30 is connected to a mixer circuit 32 of the sending part of the transceiver 1. Of course the frequency division ratios of the dividers 19, 29, 30 and 28 of the phase locked loop as described are again well chosen. The operation of the frequency step or tuning loop is such that upon a receipt or simultaneous sending of signals during for example a PCS (Personal Communication System) mode at a channel frequency of 1930 MHz the frequency step size of the tuning loop 6, 17, 16, 18 is 50 KHz, whereas during cellular mode at a channel frequency of 870 MHz the frequency step size is 30 KHz. In the latter mode switch 8-4 bypasses one of the dividers 29 and 30, in the case shown divider 29 of the fully to integrate at wish single chip transceiver 1 is bypassed. If for example the dividers 29 and 30 are 2-dividers, then the mixer frequency at output 31 to mixer 32 is approximately 45 MHz if switch 8-4 is open and 80 Mhz if switch 8-4 is closed, provided offset oscillator 25 is also arranged to be switchable from 180 MHz to 160 MHz.

FIG. 1 shows that the set dividers 7-1 and 7-2 and switch 8-1 are duplicated in the set dividers 7-3 and 7-4 and switch 8-2. Of course one of the set and switch can be dispensed with. Of course the dividers mentioned above may be programmable such that their frequency division ratio can be controlled in a programmable way for ensuring a wider frequency application range.

FIG. 2 shows a telecommunication system 33 comprising several transceivers 1. The telecommunication system 33 can be a radio transmission system, audio- and/or video system, control system, telemetry system, local area network, wide area network. The transceivers 1 are also applicable in cordless or cellular telephone systems, as well as in a handset, a car-transceiver for mobile communication, or a transceiver in a radio base station of a mobile network.

In view of the foregoing it will be evident to a person skilled in the art that various modifications may be made within the spirit and the scope of the present invention as hereinafter defined by the appended claims and that the present invention is thus not limited to the examples provided.

What is claimed is:

1. A full-duplex radio transceiver comprising:
a transmitter portion;
a dual-conversion receiver portion;
a local oscillator;
a main loop responsive to said local oscillator for synthesizing a main frequency signal, one or more frequency signals derived from said main frequency signal being applied to the transmitter portion and multiple frequency signals derived from the main frequency signal being applied to the receiver portion; and
an auxiliary loop responsive to said local oscillator for synthesizing an auxiliary frequency signal, an offset frequency signal derived from the auxiliary frequency signal being equal to a frequency offset between a transmit channel and a receive channel during full-duplex operation.

2. The transceiver of claim 1, comprising
a frequency divider arrangement connected between the local oscillator and the transmitter means and connected between the local oscillator and the receiver means, the frequency divider arrangement receiving the main frequency signal providing in response thereto two oscillating signals to the receiver portion for use in dual conversion.

3. A transceiver as claimed in claim 2, wherein the frequency divider arrangement comprises at least one integer frequency divider.

4. A transceiver as claimed in claim 2, wherein the frequency divider arrangement comprises a 2-divider and a 3-divider.

5. A transceiver as claimed in claim 2, wherein the frequency divider arrangement comprises switching means for switching from one frequency division ratio to another frequency division ratio.

6. A transceiver as claimed in claim 5, wherein the switching means comprises short-circuiting means to bypass at least one frequency divider of the frequency divider arrangement.

7. A transceiver as claimed in claim 2, wherein the transceiver is a single chip transceiver.

8. A full-duplex radio transceiver comprising:
a transmitter portion;
a receiver portion;
a local oscillator;
a main loop responsive to said local oscillator for synthesizing a main frequency signal, one or more frequency signals derived from said main frequency signal being applied to the transmitter portion and the receiver portion; and
an auxiliary loop responsive to said local oscillator for synthesizing an auxiliary frequency signal, an offset frequency signal derived from the auxiliary frequency signal being equal to a frequency offset between a transmit channel and a receive channel during full-duplex operation.

9. The transceiver of claim 8, wherein the receiver portion is a dual-conversion receiver, comprising
a frequency divider arrangement connected between the local oscillator and the transmitter means and connected between the local oscillator and the receiver means, the frequency divider arrangement receiving the main frequency signal providing in response thereto two oscillating signals to the receiver portion for use in dual conversion.

* * * * *